US012767167B2

(12) United States Patent
Edwards et al.

(10) Patent No.: US 12,767,167 B2
(45) Date of Patent: Oct. 20, 2026

(54) VEHICLE CONTROL WITH INCOMPLETE CALIBRATION

(71) Applicant: GM Cruise Holdings LLC, San Francisco, CA (US)

(72) Inventors: Zachary Matthew Logan Edwards, San Francisco, CA (US); David Xuan Vu Tran, Denver, CO (US)

(73) Assignee: GM Cruise Holdings LLC, San Francisco, CA (US)

( * ) Notice: Subject to any disclaimer, the term of this patent is extended or adjusted under 35 U.S.C. 154(b) by 803 days.

(21) Appl. No.: 17/553,292

(22) Filed: Dec. 16, 2021

(65) Prior Publication Data

US 2023/0192116 A1 Jun. 22, 2023

(51) Int. Cl.
*B60W 60/00* (2020.01)
*G01C 21/36* (2006.01)
*H04W 4/40* (2018.01)

(52) U.S. Cl.
CPC ....... *B60W 60/001* (2020.02); *G01C 21/3605* (2013.01); *H04W 4/40* (2018.02); *B60W 2554/4041* (2020.02); *B60W 2554/4049* (2020.02)

(58) Field of Classification Search
CPC ............... B60W 60/00; B60W 60/001; B60W 2554/00; B60W 2554/40; B60W 2554/404; B60W 2554/4041; B60W 2554/4049; G01C 21/00; G01C 21/26; G01C 21/34; G01C 21/36; G01C 21/3602; G01C 21/3605; H04W 4/00; H04W 4/30; H04W 4/40
See application file for complete search history.

(56) References Cited

U.S. PATENT DOCUMENTS 11,594,037 B1 * 2/2023 Grossman ............... H04W 4/40
2015/0110344 A1 * 4/2015 Okumura ............. G06V 20/588 382/103
2018/0284243 A1 * 10/2018 Wood ................... G05D 1/0234
2020/0130570 A1 * 4/2020 Elli ........................ B60Q 1/545
2021/0026348 A1 * 1/2021 Gogna ................. G05D 1/0038
2022/0097725 A1 * 3/2022 Corte ..................... G06V 20/58
2023/0166759 A1 * 6/2023 Yasuda ................... H04W 4/46 701/23

* cited by examiner

*Primary Examiner* — Khoi H Tran
*Assistant Examiner* — Sarah A Tran
(74) *Attorney, Agent, or Firm* — Honigman LLP; Matthew H. Szalach

(57) ABSTRACT

An autonomous vehicle (AV) navigates with limited calibration of sensors and other components. To navigate with a less-reliable sensing and control capacity, the AV uses sensors to detect a navigation path within the environment of the AV. The navigation path may include encoded information describing a destination or distance to information, which may be decoded by the AV to select a navigation path or determine movement of the AV along the path. To control movement of the AV along the path, the AV may monitor the navigation path after the AV executes a motion plan to determine the relative motion of the navigation path within the sensor data. The navigation path moving towards or away from a sensor may be used to determine whether the AV is moving towards or away from the navigation line despite relatively unknown sensed characteristics of the environment or actual movement in the environment.

20 Claims, 5 Drawing Sheets

VEHICLE CONTROL WITH INCOMPLETE CALIBRATION

TECHNICAL FIELD

This disclosure relates generally to automated vehicle navigation, and particularly to navigation of vehicles having uncalibrated or semi-calibrated sensors.

BACKGROUND

Various devices may sense an environment around the device and determine movement based on the sensed environment. One example is an autonomous vehicle (AV), which a vehicle that is capable of sensing and navigating its environment with little or no user input and thus be fully autonomous or semi-autonomous. An autonomous vehicle may sense its environment using sensing devices such as Radio Detection and Ranging (RADAR), Light Detection and Ranging (LIDAR), image sensors, cameras, and the like. An autonomous vehicle system may also use information from a global positioning system (GPS), navigation systems, vehicle-to-vehicle communication, vehicle-to-infrastructure technology, or drive-by-wire systems to navigate the vehicle.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
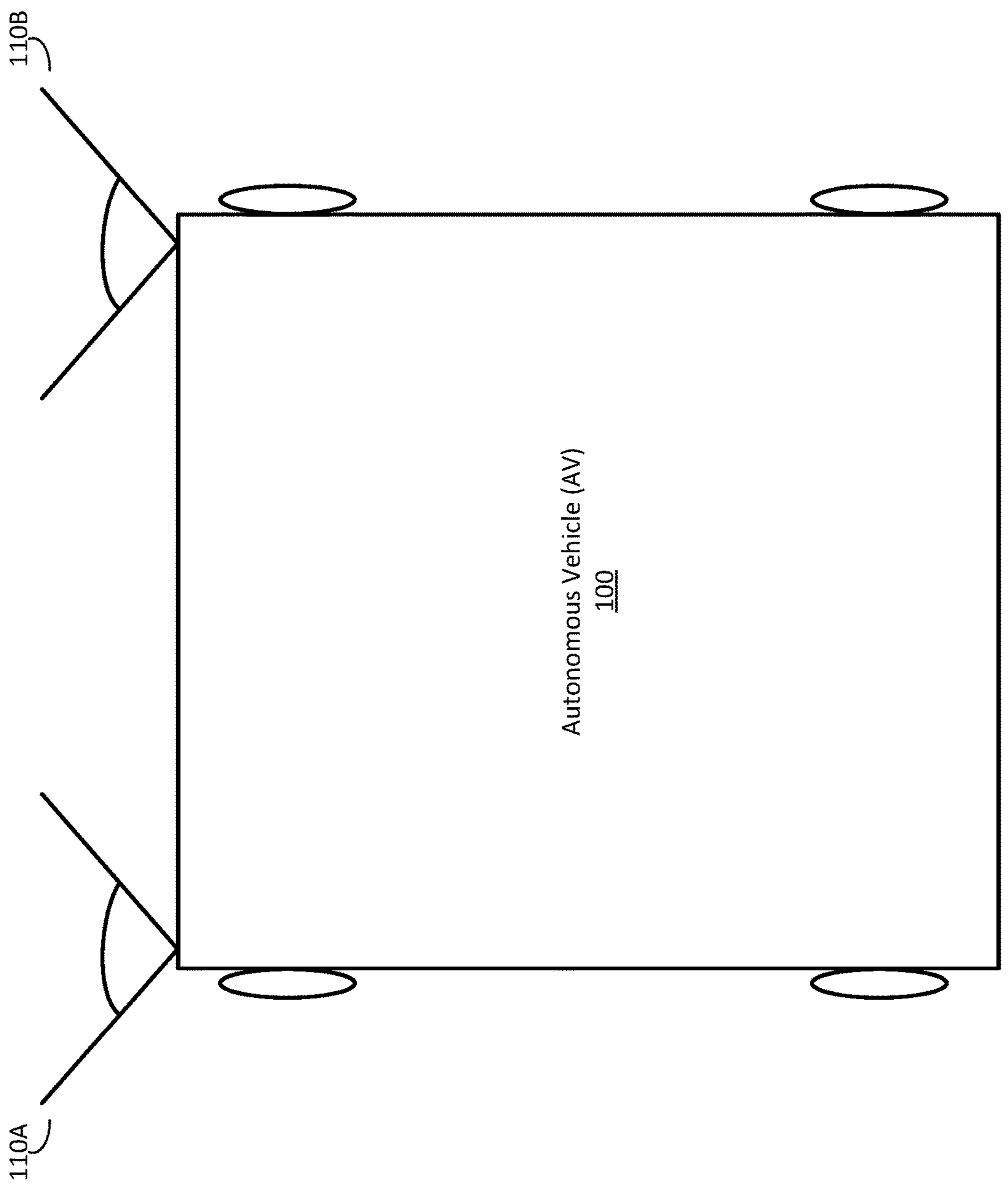
FIG. 1 shows an autonomous vehicle (AV) including example sensors, according to one embodiment.

For complex systems (such as AVs) using a variety of sensors to detect characteristics of an environment, calibration of those sensors is essential to accurately identify objects in the environment, translate sensor-captured information to a joint coordinate system relative to other sensors, and generally acquire an accurate measure of the world around the sensors. For example, systems may include an array of different sensors, such as image sensors (e.g., light cameras), LIDAR, RADAR, and other types of sensors that capture information about the world. To construct an accurate representation of the environment captured by the sensors, such sensors may need to be calibrated with respect to each respective sensors' relation to one another, such that information captured by those sensors may be effectively merged to a reliable representation of the environment as a whole.

In addition, particularly during the manufacturing process, AVs may have additional components and sensors that are calibrated after the AV itself has been assembled. For example, the AV chassis (e.g., the frame on which the sensors and other components are assembled) may also include an inertial measurement unit (IMU) that may include accelerometers, gyroscopes, and/or magnetometers to determine gyroscopic tilt and force/acceleration measurements that may also require calibration with respect to the assembled AV. In addition, within the manufacturing environment, an AV may have additional mechanical components that require further calibration after the AV itself is calibrated. For example, the wheels and steering assembly may also require fine-tuning and calibration such that the wheels are properly aligned on the chassis and to identify/align a neutral position of the steering assembly that corresponds to "straight" forward movement of the vehicle. When these are not yet calibrated, "intended straight" movements may yield skewed movement in the physical environment and may compound the difficulty of properly moving the AV when other components are also not yet calibrated.

As a result, automating movement of the AV without calibration of many such components typically used for object detection and navigation is a difficult problem. Instead, many solutions, e.g., in a manufacturing environment, do not move the vehicle under automated control and instead use human intervention for moving insufficiently calibrated vehicles that may otherwise be capable of autonomous or semi-autonomous movement.

To properly enable movement of an AV with uncalibrated components (or in another situation in which the sensed characteristics of an environment are unreliable), the AV may be provided a navigation path that may be sensed with uncalibrated sensors and used to guide the AV to a destination. The AV may be positioned near a navigation path that is detected by one or more sensors of the AV. The navigation path may include various characteristics for detection by the sensors, such as high-contrast areas to assist in identification by the AV. The AV determines an initial motion plan based on the detected navigation path within the view of a sensor and "follows" the navigation path to a destination. In various examples, more than one navigation path may be used that lead to additional destinations. The navigation path may also encode information such as a distance or a destination to which the navigation path leads.

As the AV moves, the AV may then monitor the navigation path within the view of the sensor and determine further motion plans (e.g., modify the planned movement of the AV) based on the navigation path as detected in captured sensor data. For example, although the sensors may be uncalibrated, the navigation path within the view of the sensor may still be expected to appear larger when the sensor approaches the path and to appear smaller when the sensor is further from the path. This may allow the navigation to infer whether the AV is getting closer to or further away from the navigation path. When two or more sensors perceive the navigation path, the relative size and thus distance of the navigation path may also be determined by triangulating the relative sizes from the sensors. This allows the AV to navigate with the navigation path even when the sensors may yet to be calibrated with respect to various types of sensing/perception calibration, and when mechanical characteristics to reliably determine a neural steering position, movement speed, and so forth may also be uncalibrated.

As will be appreciated by one skilled in the art, aspects of the present disclosure, may be embodied in various manners (e.g., as a method, a system, a computer program product, or a computer-readable storage medium). Accordingly, aspects of the present disclosure may be implemented in hardware, software, or a combination of the two. Thus, processes may be performed with instructions executed on a processor, or various forms of firmware, software, specialized circuitry, and so forth. Such processing functions having these various implementations may generally be referred to herein as a "module." Functions described in this disclosure may be implemented as an algorithm executed by one or more hardware processing units, e.g., one or more microprocessors of one or more computers. In various embodiments, different steps and portions of the steps of each of the methods described herein may be performed by different processing units and in a different order unless such an order is otherwise indicated, inherent or required by the process. Furthermore, aspects of the present disclosure may take the form of one or more computer-readable medium(s), e.g., non-transitory data storage devices or media, having computer-readable program code configured for use by one or more processors or processing elements to perform related processes. Such a computer-readable medium(s) may be included in a computer program product. In various embodiments, such a computer program may, for example, be sent to and received by devices and systems for storage or execution.

This disclosure presents various specific examples. However, various additional configurations will be apparent from the broader principles discussed herein. Accordingly, support for any claims which issue on this application is provided by particular examples as well as such general principles as will be understood by one having ordinary skill in the art.

In the following description, reference is made to the drawings where like reference numerals can indicate identical or functionally similar elements. Elements illustrated in the drawings are not necessarily drawn to scale. Moreover, certain embodiments can include more elements than illustrated in a drawing or a subset of the elements illustrated in a drawing. Further, some embodiments can incorporate any suitable combination of features from two or more drawings.

As described herein, one aspect of the present technology may be the gathering and use of data available from various sources to improve quality and experience. The present disclosure contemplates that in some instances, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various examples, these are merely examples used to simplify the present disclosure and are not intended to be limiting.

Reference may be made to the spatial relationships between various components and to the spatial orientation of various aspects of components as depicted in the attached drawings. However, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having," or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

Autonomous Vehicle Sensors

FIG. 1 shows an autonomous vehicle (AV) 100 including example sensors according to one embodiment. The autonomous vehicle 100 shown in FIG. 1 includes two imaging sensors (e.g., cameras) 110A-B. Although not expressly shown in FIG. 1, the AV 100 may include a wide variety of various sensors and sensor types for capturing information about the environment surrounding the AV 100 and navigate the environment using the sensed information. As such, the sensors of the AV 100 may further include additional imaging sensors 110, as well as LIDAR, RADAR, IMU, location and positioning sensors (e.g., a GPS sensor), among others. Together, such sensors may enable the AV 100 to capture various aspects of the environment and construct a model of the environment around the AV, detect and navigate the environment, and so forth. Such sensors may initially (e.g., during manufacture) be uncalibrated, such that the perceived characteristics of the environment of the AV 100 may be unreliable and, before calibration, unsuitable for use with more complex sensing and perception algorithms. To provide for autonomous navigation while various components are not yet calibrated, for example within a factory or other manufacturing or assembly environment, the AV 100 may navigate with respect to a navigation path to enable the AV 100 to properly move itself to various locations for calibration and other final assembly/manufacturing steps.

The autonomous vehicle 100 may include a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 100 may additionally or alternatively include interfaces for control of any other vehicle functions; e.g., windshield wipers, headlights, turn indicators, air conditioning, etc.

In addition, the autonomous vehicle 100 also includes an onboard computer and various sensors (e.g., to detect information for a computer vision ("CV") system, such sensors including LIDAR, RADAR, wheel speed sensors, GPS, cameras, etc.). The onboard computer controls the autonomous vehicle 100 and processes sensed data from the sensors to determine the state of the autonomous vehicle 100. Based upon the vehicle state and programmed instructions, the onboard computer modifies or controls driving behavior of the autonomous vehicle 100.

Driving behavior may include any information relating to how an autonomous vehicle drives (e.g., actuates brakes, accelerator, steering) given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if it detects an animal jumping in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes).

The onboard computer is preferably a general-purpose computer adapted for I/O communication with vehicle control systems and sensor systems but may additionally or alternatively be any suitable computing device. The onboard computer may also be connected to wireless networks via a wireless connection (e.g., via a cellular data connection). Additionally or alternatively, the onboard computer may be coupled to any number of wireless or wired communication systems.

Figure 2:
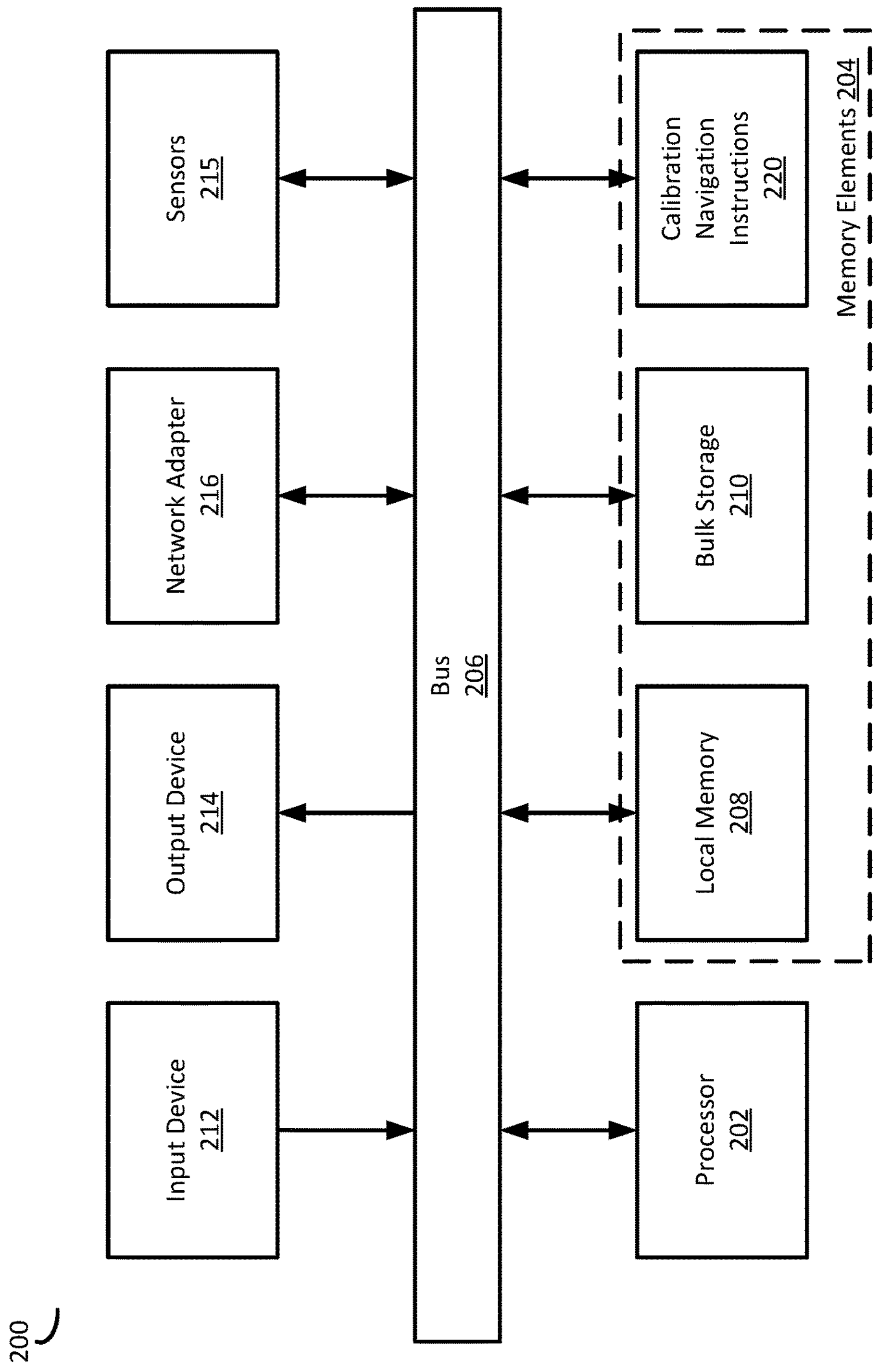
FIG. 2 is a block diagram illustrating electronics of an example system for implementing portions of autonomous vehicle control, according to one embodiment.

FIG. 2 is a block diagram illustrating electronics of an example system 200 for implementing portions of autonomous vehicle control for, e.g., an AV as shown in FIG. 1. As shown in FIG. 2, the system 200 may include at least one processor 202, e.g., a hardware processor 202, coupled to memory elements 204 through a system bus 206. As such, the system may store program code (e.g., computing instructions) and/or data within memory elements 204. Further, the processor 202 may execute the program code accessed from the memory elements 204 via a system bus 206. In one aspect, the system 200 may be implemented as a computer that is suitable for storing and/or executing program code (e.g., the onboard computer). It should be appreciated, however, that the system 200 may be implemented in the form of any system including a processor and a memory that is capable of performing the functions described in this disclosure.

In some embodiments, the processor 202 can execute software or an algorithm to perform the activities as discussed in this specification; in particular, activities related to navigation of an AV with limited calibration. The processor 202 may include any combination of hardware, software, or firmware providing programmable logic, including by way of non-limiting example a microprocessor, a digital signal processor (DSP), a field-programmable gate array (FPGA), a programmable logic array (PLA), an integrated circuit (IC), an application specific IC (ASIC), or a virtual machine processor. The processor 202 may be communicatively coupled to the memory elements 204, for example in a direct-memory access (DMA) configuration, so that the processor 202 may read from or write to the memory elements 204.

In general, the memory elements 204 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked, or sent to or from any of the components of the system 200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for control of an autonomous vehicle as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 204 shown in FIG. 2, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processor 202 shown in FIG. 2, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 204 may include one or more physical memory devices such as, for example, local memory 208 and one or more bulk storage devices 210. The local memory may refer to RAM or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from the bulk storage device 210 during execution.

As shown in FIG. 2, the memory elements 204 may store calibration navigation instructions 220 for performing navigation with limited calibration and other functions as discussed herein. In various embodiments, the calibration navigation instructions 220 may be stored in the local memory 208, the one or more bulk storage devices 210, or apart from the local memory and the bulk storage devices. The system 200 may further execute an operating system (not shown in FIG. 2) that can facilitate execution of the instructions 220. The instructions 220 may be implemented as executable program code and/or data, can be read from, written to, and/or executed by the system 200, e.g., by the processor 202. Responsive to reading from, writing to, and/or executing calibration navigation instructions 220, the system 200 may be configured to perform one or more operations or method steps described herein.

Input/output (I/O) devices depicted as an input device 212 and an output device 214, optionally, may be coupled to the system 200. Examples of input devices may include, but are not limited to, a keyboard, a pointing device such as a mouse, or the like. Examples of output devices may include, but are not limited to, a monitor or a display, speakers, or the like. Input and/or output devices 212, 214 may be coupled to the system 200 either directly or through intervening I/O controllers. Additionally, sensors 215, may be coupled to the system 200. Examples of sensors 215 may include, but are not limited to, cameras (located inside and/or outside the AV), LIDARs, RADARs, scales, QR code readers, bar code readers, RF sensors, and others. Sensors 215 may be coupled to the system 200 either directly or through intervening controllers and/or drivers.

The system 200 may include a network adapter 216 to communicate with other devices to receive additional instructions, update programming, receive information about an environment or movement within the environment, and so forth.

Figure 3:
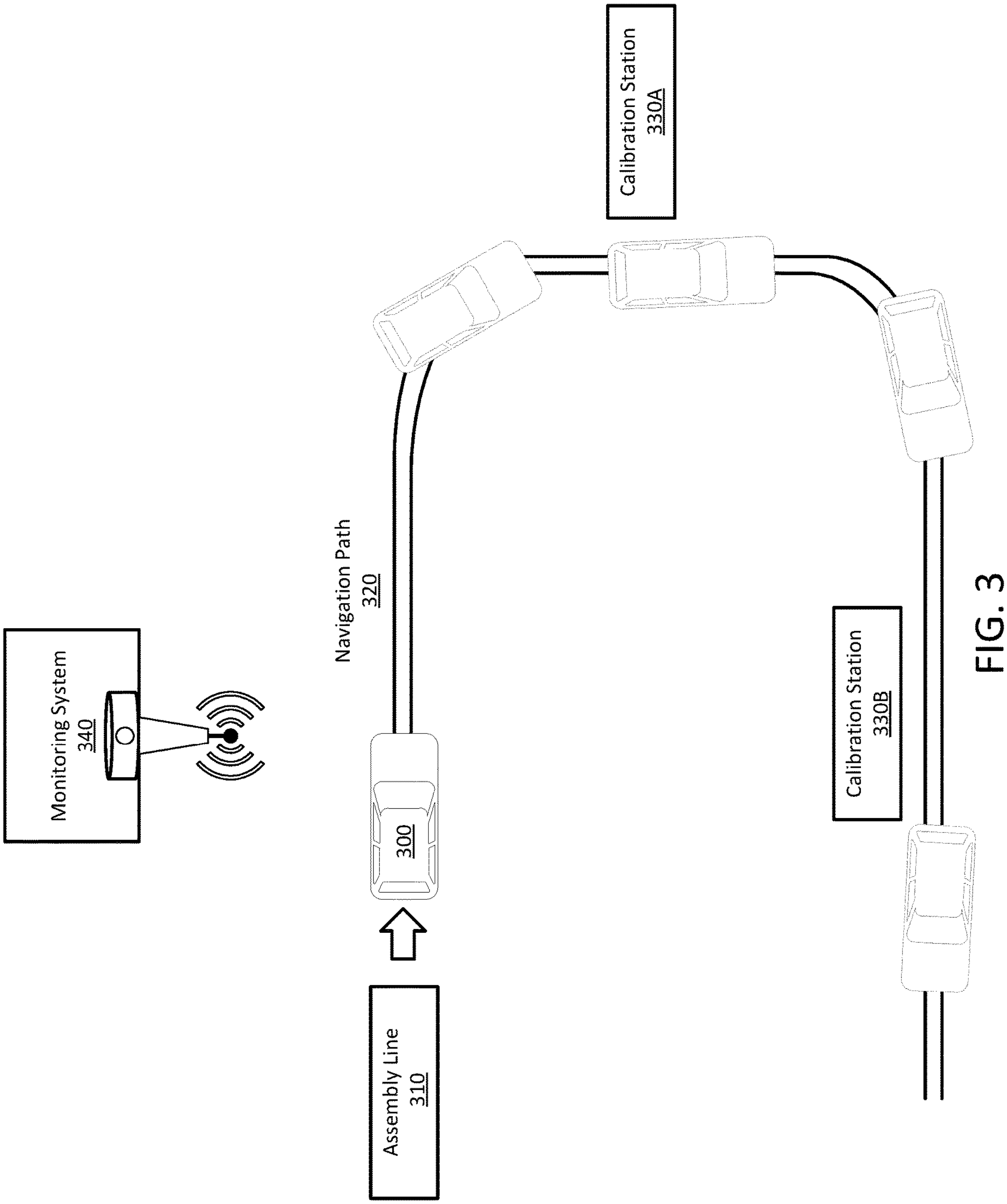
FIG. 3 shows an example of an environment in which an AV may navigate with incomplete calibration, according to one embodiment.

FIG. 3 shows an example of an environment in which an AV 300 may navigate with incomplete calibration, according to one embodiment. In this example, an AV 300 is assembled on an assembly line 310. On the assembly line 310, the AV is assembled as various components and systems are combined manufacture the AV 300, after which the AV 300 may generally include a motor chassis, steering interface, onboard computer, sensors, and other components as discussed herein. The AV 300 after assembly on the assembly line 310 may thus be capable of movement and sensing of the environment but may require calibration of various components and further steps to prepare the AV 300 for delivery and further use of the AV 300 outside the manufacturing/factory environment. Although the environment shown here may represent a factory or other manufacturing setting, the techniques disclosed herein may generally be applicable to other environments. For example, the navigation approach discussed herein may be used in other circumstances in which the navigation of a vehicle is performed in situations in which the vehicle has uncalibrated components, for example after replacement of sensors or other parts or an accident or other incident prevents reliance on prior calibration of the vehicle components.

The AV 300 may thus have components for environmental perception and automated control but lack a variety of calibration aspects for successful operation with perception and control systems that expect calibrated sensors and other parameters for normal operation. For the sensors, such calibration may include intrinsic calibration (e.g., calibration to account for distortions and other imperfections in the capture process for a particular sensor), extrinsic calibration (e.g., the relative pose of each sensor with respect to one another or with respect to the frame/chassis of the AV), calibration of the IMU, speed sensors, RADAR/LIDAR pose and depth calibration, etc. Such calibration may also include calibration and alignment of other physical characteristics of the AV 300 to assist in navigation and control of the AV 300. As a result, after assembly and before the various further calibration and finishing steps, the appropriate parameters to correct various sensor configurations may be unknown, and the expected movement of the vehicle given a particular movement instruction (e.g., throttle, brake, and steering) may have a significant error with respect to the vehicle's actual movement. Stated another way, there may be a discrepancy (i.e., due to the lack of calibration) in the actual movement of the vehicle given particular control instructions, and the actual movement (and its discrepancy) may be difficult to correctly and automatically perceive using the sensors on the AV 300 when those component are incompletely calibrated.

To navigate the AV 300, a navigation path 320 is included in the environment to assist the AV 300 in navigating to various locations within the environment. In general, one or more navigation paths 320 are included in the environment to guide the AV 300 and enable the AV 300 to navigate with respect to the navigation path 320 to properly reach destinations within the environment, for example, to various calibration stations 330 at which calibration may be performed. The navigation path 320 may comprise any suitable visible path or sequence of symbols detectable by the AV 300. Thus, in one example the navigation path 320 is graphically drawn, printed, or physically displayed on the ground or floor of the environment. In another example, the navigation path 320 may be composed of a set of movable "tiles" (e.g., floor mats) that can be repositioned to readily and conveniently change the navigation path 320. The control of the AV 300 may be performed by the various computing components and/or instructions as discussed above. The navigation path 320 and the navigation of the AV 300 with respect to it are discussed in further detail with respect to FIGS. 4 & 5.

Each of the calibration stations 330A-B may include various devices, systems, and tools for calibrating one or more aspects of the AV 300. The particular calibration steps, functions, and aspects calibrated by each calibration station 330 differ in various configurations and may be based on the particular sensors and other features of the AV 300. As one example calibration station 330, a calibration station may include a calibration scene for calibrating intrinsic characteristics of one or more imaging sensors, for example including a grid or other series of straight lines, such that the imaging sensor may determine intrinsic calibration parameters to correct for distortions or warping in the captured data from the imaging sensor such that the known-straight lines in the calibration scene are straight after transformation by the intrinsic calibration parameters. As another example of a calibration station 330, the calibration station 330 may include a set of objects for calibrating the relative pose (e.g., position and orientation) of the various sensors of different types with respect to one another or with respect to the chassis of the AV 300. As another example, the calibration station 330 may include a structure with known characteristics and placement of the AV 300 with respect to the structure for calibrating a position of a LIDAR sensor, for example to calibrate a frame of reference (e.g., a coordinate system) of the LIDAR and a data point cloud captured by the LIDAR sensor with a frame of reference of the AV 300 chassis or an origin point of a joint coordinate system used in conjunction with other sensors on the AV 300.

As a general matter, the AV 300 may require calibration of a large number of components and may proceed to a sequence of calibration stations 330 each configured to calibrate one or more of the components, such that the AV 300 is completely calibrated after visiting the sequence of calibration stations. Thus, while two calibration stations 330 are shown in FIG. 3, an environment may include a large number of different types of calibration stations. In addition, depending on the time required to perform each calibration and the number of calibration stations 330, more than one calibration station 330 may perform a particular type of calibration, such that different vehicles may be calibrated with respect to a particular type of calibration at different calibration stations 330. As such, although a single navigation path 320 is shown in FIG. 3, in different embodiments more than one navigation path 320 may be included and paths may cross, merge, diverge, etc., to guide an AV 300 to various calibration stations 330. As discussed further with respect to FIG. 4, a navigation path may encode information describing the calibration station 330 that the navigation path leads to (e.g., an encoded identification of the destination along the path) along with other types of information encoded in the navigation path, such as distance information (i.e., markers indicating distance traveled).

As shown in FIG. 3, the AV 300 may navigate based on the navigation path 320 to arrive at various destinations, such as the calibration stations 330. As the AV 300 may include uncalibrated components, the AV 300 may also include some error in following the navigation path. To navigate the path, the AV 300 may generate a sequence of motion plans based on the perceived navigation path 320 and modify or generate additional motion plans as the motion plans are executed (i.e., the vehicle moves according to the motion plan), and the navigation path accordingly moves within the captured sensor data. For example, the control of the AV 300 may generate a motion plan to steer left by three degrees with a throttle expected to move at a speed of two miles-per-hour. Based on the movement of the navigation path within the sensed data (which may include encoded information describing distance), the navigation control of AV 300 may determine that the AV 300 oversteered and moved a further speed/distance than expected, such that a subsequent motion plan may be determined to account for the additional steering and higher-than-expected speed of the vehicle. This permits the AV 300 to correct its movement with respect to the navigation path 320 as the AV 300 moves and determine its movement based in part on the sensed movement of the navigation path 320.

The environment shown in FIG. 3 also includes a monitoring system 340 that may monitor and coordinate movement of various AVs 300. In the example shown in FIG. 340, the monitoring system 340 includes a wireless transceiver for communication with the AV 300 and a sensor for monitoring the environment. Though one monitoring system 340 is shown in FIG. 3, additional configurations may include a plurality of different monitoring systems for monitoring and communicating with AV devices within the environment.

The sensors of the monitoring system 340 may be disposed on the monitoring system 340 or variously located in the environment and are used to monitor the movement and location of AVs 300 and other objects within the environment, such as people, objects (e.g., carts and tooling), and other things within the environment. The monitoring system 340 may apply computer vision and object tracking algorithms to recognize and track the movement of detected objects within the environment. The monitoring system 340 may provide a supplemental mechanism for verifying movement of the AV 300 in addition to the control provided by the AV 300. As one example, the monitoring system 340 may thus determine whether the AV 300 is successfully navigating with respect to the navigation path 320 or whether there is a risk of collision for a moving AV 300 with another thing or object in the environment. In circumstances in which the AV 300 provides its own control processes for monitoring its sensor data to follow the navigation path 320, the sensing and processing capabilities of the AV 300 may thus be effectively used and reduce detailed processing and communication by the monitoring system 340.

The monitoring system 340 may individually identify AVs according to an identifier associated with each AV and, when necessary, send a control command to the AV 300, for example to stop when the AV is not following the path or when the AV is within a threshold proximity to another object (or otherwise determine that a collision may occur). The monitoring system 340 may also provide a means for alternate control of the AV 300, for example if the navigation of the AV 300 is ineffective or has departed from the navigation path 320. The monitoring system 340 may use its own perception systems to determine proper control for the AV 300 to return to the navigation path 320 or may provide an interface for manual human control of the AV 300, such as by operation with a controller. Because the AV 300 may generally successfully navigate the navigation path 320 using its own sensors, the extent of perception, control, and programming provided by the monitoring systems 340 may also be reduced relative to solutions which may use remote sensing and control for directing AVs having incomplete calibration.

The monitoring system 340 may also be responsible for providing instructions to the AV 300 with respect to a destination for the AV 300, for example a particular calibration station 330. The monitoring system 340 may also monitor the respective queues and wait times at particular calibration stations and coordinate the logistics for the various AVs and calibration stations 330. Such logistics may include, for example, particular calibrations to be performed at which time for each AV 300 or the respective sequence of calibration stations 330 for an AV to visit. In one embodiment, at each calibration station 330, after calibration is complete at that station a signal may be sent to the monitoring system 340 to update the completed calibrations for the AV 300 and instruct the AV 300 with a destination of the next calibration station 330.

As the AV 300 approaches a destination, the AV 300 may detect the destination (e.g., a calibration station) in various ways. In one embodiment, the destination may be designated with encoded information in the navigation path 320. For example, the navigation path 320 may encode a value representing a "distance to" a destination, such that the AV 300 stops when it reaches an encoded "distance to" value of zero. In other embodiments, the navigation path 320 may include another signifier or other symbol indicating that the AV 300 has reached the destination and the AV 300 may stop when the AV reaches the signifier or the signifier is at a certain position with respect to sensors of the AV. In various embodiments, the AV 300 may also detect or confirm arrival at the destination based on a radio frequency identification (RFID) associated with the destination. For example, the destination may include an RFID tag that may be sensed by an RFID transceiver of the AV 300. When the AV 300 receives a signal from the RFID tag associated with the designated destination, the AV 300 may determine that it is at or near the destination.

In various embodiments, the destination may include a movement mechanism for moving, aligning, or placing the AV 300 in a desired location when the AV 300 arrives at the destination. For example, a calibration station 330 may include a correlator (e.g., having a V-shaped entrance) to place or align the wheels of the AV 300 to guide the AV 300 into a specific location or placement for the calibration and may be capable of guiding forward movement or for laterally translating the AV 300 to a particular location. Similarly, such a mechanism may include a track or guide for moving the AV along a path or track during the calibration. Particularly, because the AV 300 may be imprecisely moved towards the calibration station 330 as it follows the navigation path 320, such a mechanism may be used for more precisely aligning or positioning the AV 300 for the particular calibration performed at that destination. Various additional mechanisms or devices may be used to further position the AV 300 for calibration. As an additional example, a mechanism for moving the AV at the destination may also be combined with the location sensing, e.g., of an RFID tag. In this example, the RFID tag may be detectable by the AV 300 when the AV 300 enters the movement mechanism, such that the AV 300 may stop once it detects the RFID tag and the movement mechanism may subsequently move or align the vehicle for performing the calibration of that calibration station 330.

Figure 4:
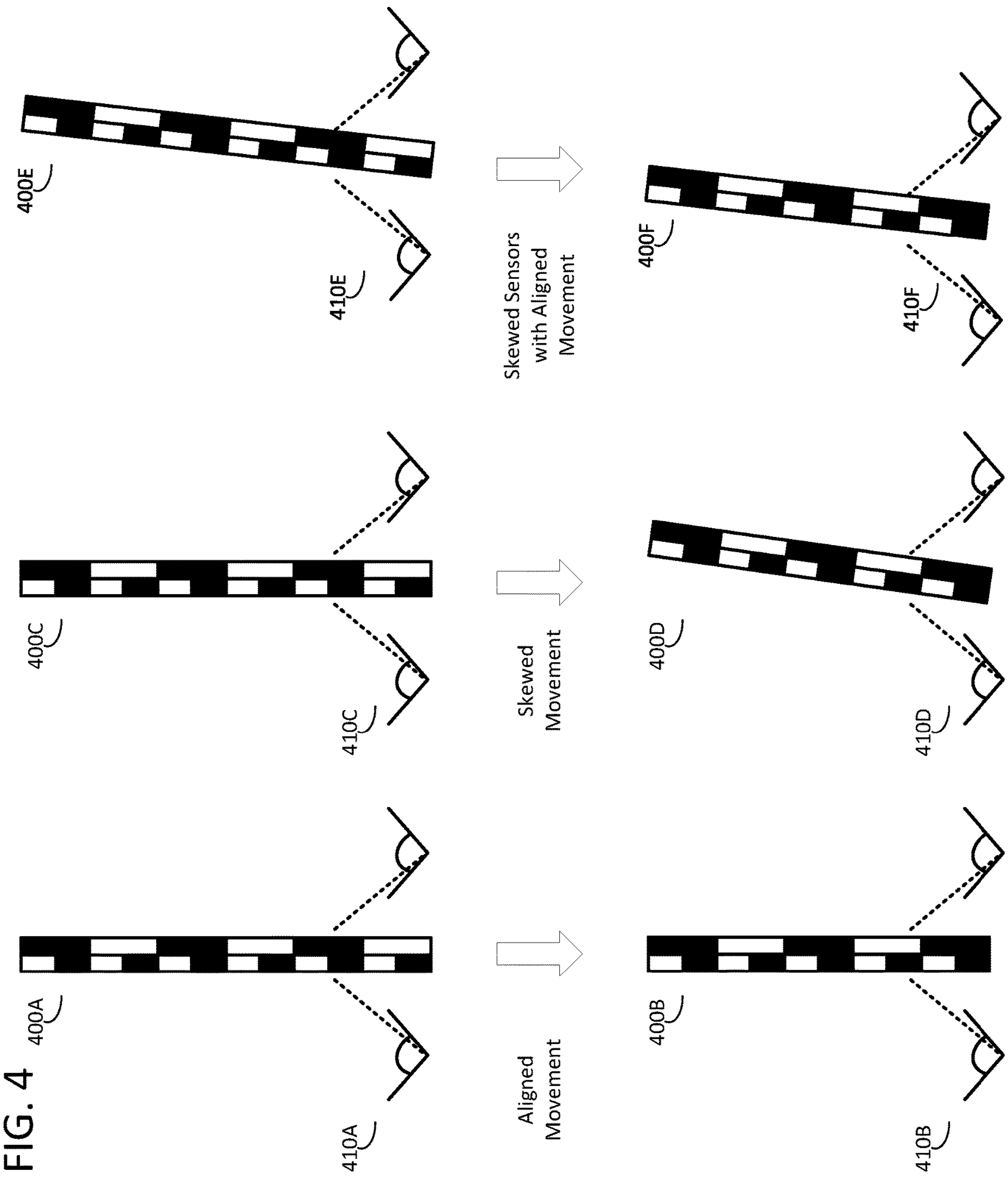
FIG. 4 shows example navigation paths with corresponding sensors with example movement of an autonomous vehicle, according to one embodiment.

FIG. 4 shows example navigation paths 400A-F with corresponding sensors 410A-F with example movement of an autonomous vehicle, according to one embodiment. The example navigation paths 400 shown in FIG. 4 include high-contrast markings to aid in identification of the navigation path 400 within the sensor data captured by sensors 410. The sensors 410 are affixed to an autonomous vehicle as discussed above and may be used to navigate the autonomous vehicle with respect to the navigation path 400 towards a destination. In this example, the navigation path 400 includes an alternating black and white pattern and different sides which may signify, e.g., a desired or expected orientation of the autonomous vehicle (or sensors 410 thereon) with respect to the navigation path 400. Various different types of navigation paths may be used with various types of patterns for detection by the sensors 410. For example, when multiple navigation paths may be used, each path may include a different color, pattern, or other characteristic for distinguishing the navigation paths within the view of the sensors 410. Further, in this example one navigation path 400 is shown that is generally intended to be positioned between two sensors 410 during navigation of the AV towards the destination. In various embodiments, the navigation path 400 to a particular destination may include multiple individual lines or patterns that may be spatially separated from one another. For example, in one embodiment a separate line or pattern may be included in the navigation path and positioned to generally align with the expected position of each sensor expected to view and monitor the navigation path as the AV moves towards the destination. As another example, while shown here as a continuous line, the navigation path 400 may also include a sequence of symbols, patterns, characters, or the like that together form a navigation path 400. As such, a variety of different types of navigation paths 400 may be used in different configurations to guide the AV towards a destination.

As another example, the navigation path 400 may encode information within its pattern. Such information may include, for example, distance information or destination information that may be decoded by the AV and used to modify movement of the AV. For example, the distance information may encode or describe a distance between portions of the navigation line. In the example of FIG. 4, the navigation path 400 may include a repeating pattern of contrasting areas, such that each area is a known area or region having a known distance from the beginning to the end of the area. In another example, the navigation path may encode distance information, such as the distance to a destination along the path in a portion of the navigation path according to any suitable encoding scheme. Multiple types of information may be encoded in the same navigation path 400. For example, the navigation path may encode a specified distance on one portion of the navigation path, such as one side of the navigation path with alternating contrasting colors, while another portion may encode the distance information representing a distance to a destination with a binary code (e.g., a black portion represents a 0 and a white portion represents a 1), or a code based on different encoded symbols, for example based on a color or pattern in the navigation path 400. Likewise, destination information such as a numerical identifier of a particular destination along or at the end of the navigation path may also be encoded in the navigation path 400. The distance or destination information may then be used by the AV to select a navigation path 400 (e.g., to determine the navigation path leads to the desired destination) or to determine a remaining distance to the destination (using encoded distance information) or may use the encoded distance (e.g., that a particular portion of the path is e.g., one-half of a meter) to determine the actual distance traveled by the AV or to determine a calibration estimate of the AV while the AV moves based on the navigation path 400. For example, the known size/distance of a portion of the line may be used to estimate calibration parameters or otherwise adjust the control during navigation.

FIG. 4 shows various examples of movement with respect to the navigation path 400. In general, the AV may use the view of the navigation path 400 in captured sensor data from sensors 410 to generate or modify a motion plan such that the navigation path is a desired relationship with respect to the sensors 410. Since the direct sensor data may be unreliable, and the AV itself may also not navigate as expected (e.g., a "neural" steering position may be unknown), rather than expecting to precisely measure the position of the navigation path, the AV may be navigated to align the navigation path relative to a position within the monitored sensor data. As the AV proceeds according to the motion plan, the AV may determine whether the navigation path is relatively becoming closer, farther, or approximately the same distance relative to the sensors 410 and use that information to determine a further motion plan for the AV. In one embodiment, to determine the relative movement of the navigation path, the AV may determine whether the navigation path is moving towards or away from a center of the captured sensor data for one or more of the sensors. Stated another way, when the navigation path becomes closer to the center of view of a sensor, this may generally represent that the sensor is approaching navigation path. In another example, a distance of a portion of the navigation path may be determined by triangulating the navigation path based on the position of the navigation path in the view of different sensors. For example, while the precise calibration of the sensors' positions with respect to one another may not be known, the position of such sensors may be expected to be within the manufacturing and assembly tolerances of the sensors and the AV and permit triangulation of the position of the navigation path.

A first example shows a navigation path 400A as viewed by sensors 410A. In this example, the navigation path 400A is positioned relatively straight ahead of the sensors 410A. When the AV proceeds "forward," the same navigation path is viewed from a new position as navigation path 420B by the sensors 410B. In this example, the movement may be considered to have moved such that the navigation path is at the same distance from the sensors 410 after the movement. To maintain movement with the navigation path, the motion plan determined based on the navigation path may continue along a similar path as the movement to the position from 400A to 400B.

In a second example, a navigation path 400C is viewed by sensors 410C. In this example, when the AV moves forward, the navigation path rotates and is relatively closer to one sensor 410D and further from the other sensor 410D. In this example, the movement of the navigation path may suggest that the AV is not moving in the direction of the navigation path, such that the next motion plan may designate that the AV turn rightwards to return the AV to a similar position with respect to the navigation path 400 as the navigation path 400C as viewed by the sensors 410C.

In a third example, a navigation path 400E is viewed by sensors 410E. In this example, the path does not appear "straight" from the perspective of the sensors 410E. This may be, for example, because the sensors 410E are not properly aligned on the AV and have a skew with respect to the frame or chassis of the AV. In this example, when the AV moves "forward," although the navigation path appears skewed with respect to the sensors (which themselves are skewed with respect to the AV), the navigation path 400F is the same distance from the sensors 410F relative to the distance viewed by sensors 410E. In this circumstance, while the navigation path appears skewed from the perspective of the sensors (e.g., because they are not yet calibrated), the AV may properly navigate with respect to the navigation path 400 by monitoring the change in the navigation path within the sensor data while or after the AV moves according to an initial motion plan.

In example sensors 410E and 410F, the sensors are similarly skewed with respect to the AV as an example; in typical applications, the sensors typically have different rotation and may thus the view of the navigation path may be skewed in different directions from the perspective of each sensor. Thus, one sensor may view the navigation path as relatively "straight" ahead (e.g., as viewed by one of the sensors 400A-B), while another sensor may view the navigation path as skewed to the right (e.g., as viewed by one of the sensors 400E-F), such that the actual position and direction of the navigation path is unknown. However, when the AV moves, the navigation path moves the same way with respect to both sensors, such that similar monitored movement is perceived by each sensor, enabling navigation using such relative movement without relying on additional calibration to harmonize the sensor data.

Figure 5:
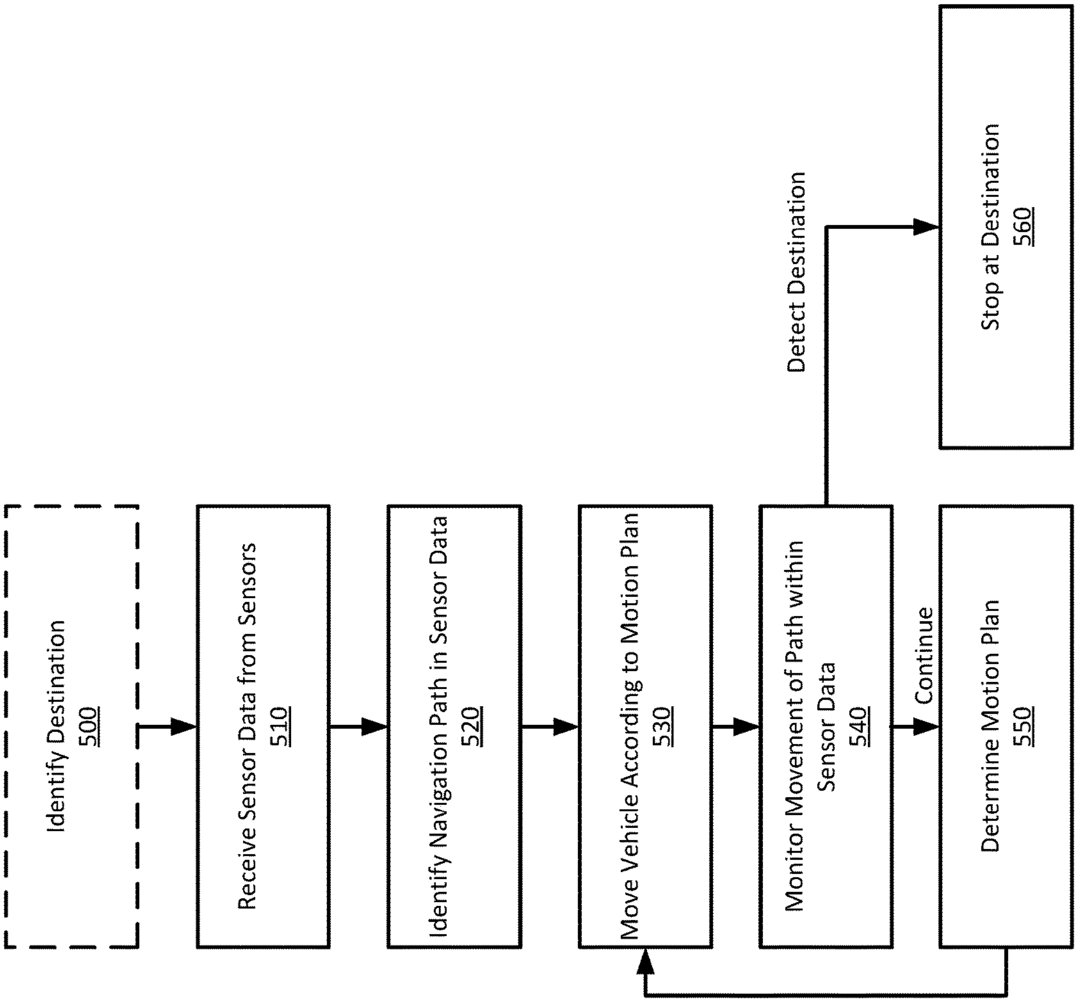
FIG. 5 provides an example flowchart for a method of navigating an autonomous vehicle with incomplete calibration, according to one embodiment.

FIG. 5 provides an example flowchart for a method of navigating an autonomous vehicle with incomplete calibration, according to one embodiment. Initially, the autonomous vehicle may identify 500 a destination to navigate towards. For example, the AV may receive a destination from another system, for example the monitoring system 340 discussed with respect to FIG. 3. Next, sensor data may be received 510 from sensors, from which a navigation path may be identified 520 within the sensor data. In different examples, the sensor data may include more than one navigation path, in which case the navigation paths may be analyzed to decode a destination from the detected navigation paths and determine which navigation path corresponds to the desired destination of the AV. To navigate along the path, the AV may determine a motion plan and move 530 the vehicle according to the motion plan. During or after the movement, the sensor data is monitored 540 to determine the relative movement of the path within the sensor data to determine whether the navigation path is becoming relatively closer or farther from the various sensors. When the destination is reached (or a stop signal is received from an external source or based on a proximity of an object detected by sensors of the AV), the AV may stop 560. Until then, the AV may continue to determine 550 additional motion plans (or update the existing motion plan) based on the movement of the navigation path and continue to move the vehicle according to the determined 550 plan. Because the movement of the path is detected relative to the sensors of the AV, it may allow successful navigation along the path by the AV even with uncalibrated sensors, movement control systems (e.g., steering or wheel alignment), and when the path may turn or curve.

Example Embodiments

Various embodiments of claimable subject matter includes the following examples.

Example 1 provides for a method for self-navigation of an autonomous vehicle with incomplete calibration, the method including: receiving sensor data from a plurality of sensors disposed on an autonomous vehicle with incomplete calibration data; identifying a navigation path within the sensor data; navigating to a destination based on the identified navigation path at least in part by: moving the autonomous vehicle from a first location to a second location based on a first motion plan based on the identified navigation path; monitoring the navigation path within the sensor data; and determining a second motion plan from the second location based on the monitored navigation path.

Example 2 provides for the method of claim 1, further comprising decoding one or more of distance information or destination information from the navigation path within the sensor data and wherein the first motion plan or the second motion plan are based on the one or more of distance information or destination information.

Example 3 provides for the method of claim 1, wherein the plurality of sensors includes two imaging sensors and the navigation path is identified between the two imaging sensors.

Example 4 provides for the method of claim 1, wherein the autonomous vehicle is not calibrated with respect to intrinsic sensor parameters, extrinsic sensor parameters, sensor positions relative to a frame of the autonomous vehicle, steering alignment, wheel alignment, inertial measurement unit (IMU) parameters, distance (odometer) measurement, or any combination thereof.

Example 5 provides for the method of claim 1, wherein a first navigation path and a second navigation path are identified in the sensor data, the method further comprising selecting the first navigation or second navigation path for navigation to the destination based on destination information encoded in the first navigation path or the second navigation path.

Example 6 provides for the method of claim 1, further comprising receiving a radio frequency identification (RFID) signal associated with the destination and detecting arrival at the destination based on the RFID signal.

Example 7 provides for the method of claim 1, further comprising stopping the autonomous vehicle based on a signal received from a monitoring system.

Example 8 provides for the method of claim 1, further comprising determining the second motion plan based on a translation of the navigation path relative to a center of the sensor data of one or more of the plurality of sensors.

Example 9 provides for the method of claim 1, wherein identifying the navigation path within the sensor data includes estimating a distance of at least a portion of the navigation path based on triangulation of sensor data from a first sensor and a second sensor.

Example 10 provides for a system including a processor; and a non-transitory computer-readable storage medium containing instructions for execution by the processor for: receiving sensor data from a plurality of sensors disposed on an autonomous vehicle with incomplete calibration data; identifying a navigation path within the sensor data; navigating to a destination based on the identified navigation path at least in part by: moving the autonomous vehicle from a first location to a second location based on a first motion plan based on the identified navigation path; monitoring the navigation path within the sensor data; and determining a second motion plan from the second location based on the monitored navigation path.

Example 11 provides for the system of claim 10, the instructions further being for decoding one or more of distance information or destination information from the navigation path within the sensor data and wherein the first motion plan or the second motion plan are based on the one or more of distance information or destination information.

Example 12 provides for the system of claim 10, wherein the plurality of sensors includes two imaging sensors and the navigation path is identified between the two imaging sensors.

Example 13 provides for the system of claim 10, wherein the autonomous vehicle is not calibrated with respect to intrinsic sensor parameters, extrinsic sensor parameters, sensor positions relative to a frame of the autonomous vehicle, steering alignment, wheel alignment, inertial measurement unit (IMU) parameters, distance (odometer) measurement, or any combination thereof.

Example 14 provides for the system of claim 10, wherein a first navigation path and a second navigation path are identified in the sensor data; the instructions further executable by the processor for selecting the first navigation or second navigation path for navigation to the destination based on destination information encoded in the first navigation path or the second navigation path.

Example 15 provides for the system of claim 10, the instructions further executable by the processor for receiving a radio frequency identification (RFID) signal associated with the destination and detecting arrival at the destination based on the RFID signal.

Example 16 provides for the system of claim 10, the instructions further executable by the processor for stopping the autonomous vehicle based on a signal received from a monitoring system.

Example 17 provides for the system of claim 10, the instructions further executable by the processor for determining the second motion plan based on a translation of the navigation path relative to a center of the sensor data of one or more of the plurality of sensors.

Example 18 provides for the system of claim 10, wherein identifying the navigation path within the sensor data includes estimating a distance of at least a portion of the navigation path based on triangulation of sensor data from a first sensor and a second sensor.

Example 19 provides for one or more non-transitory computer-readable storage media containing instructions executable by one or more processors for: receiving sensor data from a plurality of sensors disposed on an autonomous vehicle with incomplete calibration data; identifying a navigation path within the sensor data; navigating to a destination based on the identified navigation path at least in part by: moving the autonomous vehicle from a first location to a second location based on a first motion plan based on the identified navigation path; monitoring the navigation path within the sensor data; and determining a second motion plan from the second location based on the monitored navigation path.

Example 20 provides for one or more non-transitory computer-readable storage media of claim 19, the instructions further executable by the one or more processors for: comprising decoding one or more of distance information or destination information from the navigation path within the sensor data and wherein the first motion plan or the second motion plan are based on the one or more of distance information or destination information.

Example 21 provides for the system of claim 19, wherein the plurality of sensors includes two imaging sensors and the navigation path is identified between the two imaging sensors.

Example 22 provides for the one or more non-transitory computer-readable storage media of claim 19, wherein the autonomous vehicle is not calibrated with respect to intrinsic sensor parameters, extrinsic sensor parameters, sensor positions relative to a frame of the autonomous vehicle, steering alignment, wheel alignment, inertial measurement unit (IMU) parameters, distance (odometer) measurement, or any combination thereof.

Example 22 provides for the one or more non-transitory computer-readable storage media of claim 19, wherein a first navigation path and a second navigation path are identified in the sensor data; the instructions further executable by the one or more processors for selecting the first navigation or second navigation path for navigation to the destination based on destination information encoded in the first navigation path or the second navigation path.

Example 23 provides for the one or more non-transitory computer-readable storage media of claim 19, the instructions further executable by the one or more processors for receiving a radio frequency identification (RFID) signal associated with the destination and detecting arrival at the destination based on the RFID signal.

Example 24 provides for the one or more non-transitory computer-readable storage media of claim 19, the instructions further executable by the one or more processors for stopping the autonomous vehicle based on a signal received from a monitoring system.

Example 25 provides for the one or more non-transitory computer-readable storage media of claim 19, the instructions further executable by the one or more processors for determining the second motion plan based on a translation of the navigation path relative to a center of the sensor data of one or more of the plurality of sensors.

Example 26 provides for the one or more non-transitory computer-readable storage media of claim 19, wherein identifying the navigation path within the sensor data includes estimating a distance of at least a portion of the navigation path based on triangulation of sensor data from a first sensor and a second sensor.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this disclosure.

Note that in this specification, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method for self-navigation of an autonomous vehicle executed on a processor that resides on the autonomous vehicle, the method comprising:
- receiving sensor data from a plurality of sensors disposed on the autonomous vehicle, the plurality of sensors comprising incomplete calibration data;
- identifying a navigation path within the sensor data, wherein the navigation path is presented in an area that is sensed by the plurality of sensors, wherein the navigation path comprises a visible path physically displayed on a ground surface of an environment, the navigation path comprising high-contrast markings for detection by the plurality of sensors; and
- navigating the autonomous vehicle to a calibration station based on the identified navigation path at least in part by:
  - moving the autonomous vehicle from a first location to a second location based on a first motion plan based on the identified navigation path, such that the autonomous vehicle follows the navigation path;
  - monitoring the navigation path within the sensor data; and
  - determining a second motion plan from the second location based on a discrepancy between the first motion plan and the monitored navigation path caused by the incomplete calibration data,
- wherein the calibration station, with the autonomous vehicle located at the calibration station, is configured to calibrate the plurality of sensors comprising the incomplete calibration data.

2. The method of claim 1, further comprising decoding distance information and destination information from the navigation path within the sensor data, wherein the first motion plan or the second motion plan is based on the one or more of distance information or destination information, and wherein the distance information is an encoded number that indicates a distance from a point where the sensor data is sensed and the first location and the destination information is an encoded identifier of the first location.

3. The method of claim 2, wherein the distance information is a binary encoded representation on a road the autonomous vehicle is navigating.

4. The method of claim 1, wherein the autonomous vehicle is not calibrated with respect to intrinsic sensor parameters, extrinsic sensor parameters, sensor positions relative to a frame of the autonomous vehicle, steering alignment, wheel alignment, inertial measurement unit (IMU) parameters, distance (odometer) measurement, or any combination thereof.

5. The method of claim 1, wherein a first navigation path and a second navigation path are identified in the sensor data, the method further comprising selecting the first navigation path or the second navigation path for navigation to the calibration station based on destination information encoded in the first navigation path or the second navigation path.

6. The method of claim 1, further comprising receiving a radio frequency identification (RFID) signal associated with the calibration station and detecting arrival at the calibration station based on the RFID signal.

7. The method of claim 1, further comprising stopping the autonomous vehicle based on a signal received from a monitoring system.

8. The method of claim 1, further comprising determining the second motion plan based on a translation of the navigation path relative to a center of the sensor data of one or more of the plurality of sensors.

9. The method of claim 1, wherein identifying the navigation path within the sensor data includes estimating a distance of at least a portion of the navigation path based on triangulation of sensor data from a first sensor and a second sensor.

10. A system comprising:

an autonomous vehicle;

a processor that resides on the autonomous vehicle; and a non-transitory computer-readable storage medium containing instructions for execution by the processor for:

receiving sensor data from a plurality of sensors disposed on the autonomous vehicle, the plurality of sensors comprising incomplete calibration data;

identifying a navigation path within the sensor data, wherein the navigation path is presented in an area that is sensed by the plurality of sensors, wherein the navigation path comprises a visible path physically displayed on a ground surface of an environment, the navigation path comprising high-contrast markings for detection by the plurality of sensors; and navigating the autonomous vehicle to a calibration station based on the identified navigation path at least in part by:

moving the autonomous vehicle from a first location to a second location based on a first motion plan based on the identified navigation path, such that the autonomous vehicle follows the navigation path;

monitoring the navigation path within the sensor data; and determining a second motion plan from the second location based on a discrepancy between the first motion plan and the monitored navigation path caused by the incomplete calibration data, wherein the calibration station, with the autonomous vehicle located at the calibration station, is configured to calibrate the plurality of sensors comprising the incomplete calibration data.

11. The system of claim 10, the instructions further being for decoding distance information and destination information from the navigation path within the sensor data, wherein the first motion plan or the second motion plan is based on the one or more of distance information or destination information, and wherein the distance information is an encoded number that indicates a distance from a point where the sensor data is sensed and the first location and the destination information is an encoded identifier of the first location.

12. The system of claim 10, wherein the plurality of sensors includes two imaging sensors and the navigation path is identified between the two imaging sensors.

13. The system of claim 10, wherein the autonomous vehicle is not calibrated with respect to intrinsic sensor parameters, extrinsic sensor parameters, sensor positions relative to a frame of the autonomous vehicle, steering alignment, wheel alignment, inertial measurement unit (IMU) parameters, distance (odometer) measurement, or any combination thereof.

14. The system of claim 10, wherein a first navigation path and a second navigation path are identified in the sensor data, the instructions further executable by the processor for selecting the first navigation path or the second navigation path for navigation to the calibration station based on destination information encoded in the first navigation path or the second navigation path.

15. The system of claim 10, the instructions further executable by the processor for receiving a radio frequency identification (RFID) signal associated with the calibration station and detecting arrival at the calibration station based on the RFID signal.

16. The system of claim 10, the instructions further executable by the processor for stopping the autonomous vehicle based on a signal received from a monitoring system.

17. The system of claim 10, the instructions further executable by the processor for determining the second motion plan based on a translation of the navigation path relative to a center of the sensor data of one or more of the plurality of sensors.

18. The system of claim 10, wherein identifying the navigation path within the sensor data includes estimating a distance of at least a portion of the navigation path based on triangulation of sensor data from a first sensor and a second sensor.

19. One or more non-transitory computer-readable storage media containing instructions executable by one or more processors that reside on an autonomous vehicle for:

receiving sensor data from a plurality of sensors disposed on the autonomous vehicle, the plurality of sensors comprising incomplete calibration data;

identifying a navigation path within the sensor data, wherein the navigation path is presented in an area that is sensed by the plurality of sensors, wherein the navigation path comprises a visible path physically displayed on a ground surface of an environment, the navigation path comprising high-contrast markings for detection by the plurality of sensors; and navigating the autonomous vehicle to a calibration station based on the identified navigation path at least in part by:

moving the autonomous vehicle from a first location to a second location based on a first motion plan based on the identified navigation path such that the autonomous vehicle follows the navigation path;

monitoring the navigation path within the sensor data; and determining a second motion plan from the second location based on a discrepancy between the first motion plan and the monitored navigation path caused by the incomplete calibration data, wherein the calibration station, with the autonomous vehicle located at the calibration station, is configured to calibrate the plurality of sensors comprising the incomplete calibration data.

20. The one or more non-transitory computer-readable storage media of claim 19, the instructions further executable by the one or more processors for:

decoding distance information and destination information from the navigation path within the sensor data, wherein the first motion plan or the second motion plan is based on the one or more of distance information or destination information, and wherein the distance information is an encoded number that indicates a distance from a point where the sensor data is sensed and the first location and the destination information is an encoded identifier of the first location.

* * * * *